United States Patent [19]
Erickson

[11] 3,724,578
[45] Apr. 3, 1973

[54] FRONT SUSPENSION FOR SNOWMOBILES

[75] Inventor: Albin R. Erickson, Roseau, Minn.

[73] Assignee: Textron, Inc., Providence, R.I.

[22] Filed: Mar. 3, 1971

[21] Appl. No.: 120,657

[52] U.S. Cl.................180/5 R, 280/25, 280/26
[51] Int. Cl......................B62b 13/12, B62m 27/02
[58] Field of Search..........180/5, 3, 4, 6; 280/21, 26, 280/25, 8–14; 244/108

[56] References Cited

UNITED STATES PATENTS

| | | | |
|---|---|---|---|
| 3,613,812 | 10/1971 | Hetteen | 280/25 |
| 1,963,630 | 6/1934 | Seversky | 244/108 |
| 3,166,338 | 1/1965 | Romsdal | 280/21 R |
| 3,425,707 | 2/1969 | Horiwchi | 280/25 X |
| 3,623,564 | 11/1971 | Higginbotham | 180/5 R |
| 1,892,064 | 12/1932 | Markey | 244/108 |
| 3,635,488 | 1/1972 | Bauer | 280/25 |

Primary Examiner—Richard J. Johnson
Attorney—Merchant & Gould

[57] ABSTRACT

A suspension system for the front running skis of a snowmobile. Each ski is yieldingly mounted by leaf springs to a steering rod on a snowmobile, and is capable of guiding the vehicle as well as compensating for terrain irregularities. A piston-cylinder shock absorber is pivotally connected at its lower end to the ski, and the upper end is connected to the snowmobile body by means of a ball and socket coupling to dampen oscillatory movement of the ski.

6 Claims, 2 Drawing Figures

PATENTED APR 3 1973 3,724,578

INVENTOR.
ALBIN R. ERICKSON
BY MERCHANT & GOULD
ATTORNEYS

FRONT SUSPENSION FOR SNOWMOBILES

The invention relates to suspension systems for snowmobiles, and is specifically directed to the improved mounting of a shock absorber between the snowmobile body and a front running ski.

The use of shock absorber to dampen vibrations or oscillatory movement within the front running skis of a snowmobile is not new. See, for example, the patent application of Ronald I. Brandli entitled "Shock Absorbing Suspension System For A Snowmobile," filed Nov. 19, 1969 under Ser. No. 877,943. The Brandli application discloses a front running ski to which a set of leaf springs is operatively connected, the leaf springs carrying the bracket member which is pivotally connected to a second bracket member rigidly affixed to the snowmobile steering rod. A shock absorber is then mounted between the ski and the lower bracket member to dampen oscillations which may be generated within the leaf springs themselves. It is also known in the prior art to connect the upper end of the shock absorber to the upper bracket member or at some point on the steering rod, which helps, to a degree, to stabilize the ski when it lifts from the ground.

My invention contemplates an improved shock absorber mounting, providing a ball and socket coupling between the upper end of the shock absorber and the snowmobile body. This increases stability of the ski, since, in addition to precluding uncontrolled vertical movement of the ski tip, it greatly decreases unwanted lateral movement in the skis which may result from a sharp bump or other irregularity in the terrain. Further, it is apparent with existing shock absorber mountings that all forces acting on the ski which result from movement over rough terrain are transferred directly to the ski supporting structure, which usually consists of the steering rod. My invention decreases stress and strain on this support by diverting part of these forces through the shock absorber itself to the snowmobile body. The improved mounting results in increased stability of the ski and a superior snowmobile ride.

DESCRIPTION OF THE PREFERRED EMBODIMENT

Figure 1:
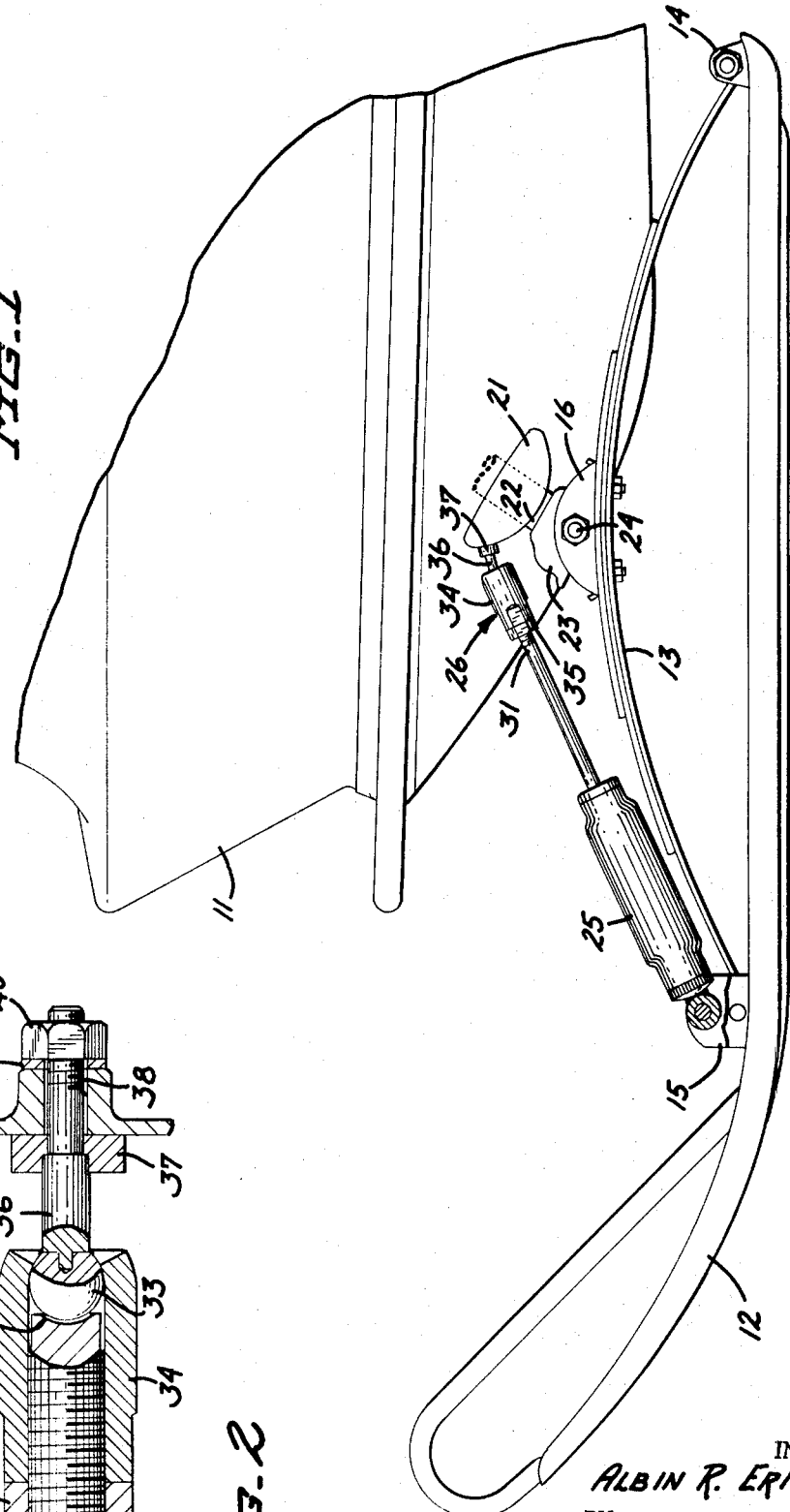
FIG. 1 is a side elevation of a snowmobile employing the improved suspension system, part thereof being broken away.

In FIG. 1, the front portion of a snowmobile body 11 is shown in combination with one of a pair of front running skis 12 and the suspension system for interconnecting the two. Yielding support between body 11 and ski 12 is offered by a set of leaf springs 13 the rear end of which is pivotally received by a bracket 14 affixed to ski 12. The front end of leaf springs 13 is slidably retained by a bracket 15 which is also affixed to ski 12.

Affixed to leaf springs 13 at essentially the midpoint thereof is a bracket 16, which, by virtue of its opposed, upstanding sides, is U-shaped in cross section. Projecting downwardly from a raised portion 21 of snowmobile body 11 is a steering rod 22 which is rotatably mounted and connected at its upper end to a steering wheel or bar (not shown). Rigidly affixed to the lower end of steering rod 22 is a bracket 23, which is sized to be received between the upstanding sides of bracket 16. A pin 24 passes through both brackets 16 and 23 to provide a pivotal connection therebetween, thus permitting ski 12 to be rotated in an essentially horizontal plane for guiding movement of the snowmobile, and for pivotal movement about pin 24 in an essentially vertical plane to compensate for terrain irregularities.

A piston-cylinder dash pot type shock absorber 25 serves to dampen vibrations or oscillatory movement of ski 12. The lower end of shock absorber 25 is pivotally connected to bracket 15 as shown, and its upper end is affixed to the raised portion 21 of snowmobile body 11 by a coupling represented generally by the numeral 26.

Figure 2:
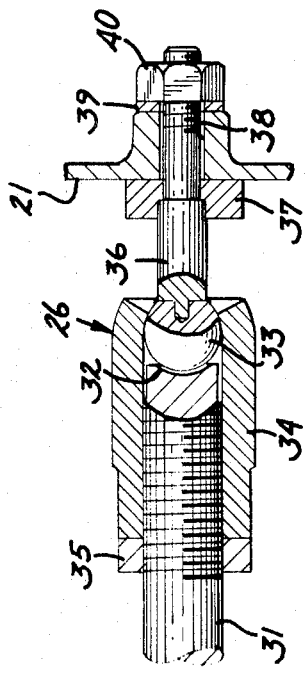
FIG. 2 is an enlarged and detailed view, part thereof in section, showing the specific mounting of a shock absorber to the snowmobile.

Referring to FIG. 2, which is a detailed representation of coupling 26, the upper end of a shock absorber 25 is shown to terminate in a threaded rod 31. The tip of rod 31 has a concave depression 32 that defines part of a socket which receives a ball 33. The remainder of the socket is formed by the arcuately converging sides of a sleeve member 34 the inner face of which is threaded for mating engagement with rod 31. A lock nut 35 operates in association with sleeve 34 to establish and maintain the appropriate socket size for ball 33.

The ball and socket coupling is connected to the raised portion 21 of snowmobile body 11 by a bolt 36, one end of which is threadably received by ball 33. Bolt 36 includes a stepped portion which mates with an appropriate collar member 37 before projecting through an opening 38 formed in raised portion 21. A lock washer 39 and nut 40 complete the connection of shock absorber 25 to snowmobile body 11.

In operation, the ball and socket coupling 26 permits free pivotal movement of shock absorber 25, which performs the vibration damping function notwithstanding the direction of movement of ski 12. In addition, by reason of its direct connection to snowmobile body 11, shock absorber 25 stabilizes the position of ski 21 when the front end of the snowmobile is aloft. This prevents unrestrained pivotal movement of skis 12 in the vertical plan when off the ground, and insures positive although yielding engagement with the ground upon their return. Further, there is a significant diversion of forces imparted to ski 12 by its movement over irregular terrain away from the connection comprising brackets 16 and 23 and directly to the snowmobile body 11 through shock absorber 25 and coupling 26. This reduces the stress on steering rod 22, thereby preserving its steering function and enhancing snowmobile performance.

What is claimed is:

1. A snowmobile comprising:
   a. a snowmobile body having at least one front running ski controllable by a rotatable steering rod;
   b. leaf spring means having a central portion and opposite ends;
   c. means for operatively connecting the opposite ends of said leaf spring means to said ski;
   d. means for operatively connecting a central portion of the leaf spring means to the rotatable steering rod for movement of the ski in an essentially horizontal plane to guide the snowmobile and in an essentially vertical plane to compensate for terrain irregularity;

e. shock absorbing means having a first end and a second end, the first end being operatively connected to said ski;

f. and coupling means for connecting the second end of the shock absorbing means to the snowmobile body separate from the rotatable steering rod, the coupling means constructed and arranged to permit free multi-directional movement of said second end with respect to the snowmobile body.

2. The snowmobile as defined by claim 1, wherein the coupling means comprises a ball and socket joint.

3. The snowmobile as defined by claim 1, wherein the first end of said shock absorbing means is pivotally connected to a forward portion of said ski.

4. The snowmobile as defined by claim 1, wherein the shock absorbing means comprises a piston-cylinder dash pot.

5. In a snowmobile having at least one front running ski yieldingly mounted by spring means to a rotatable steering rod for movement in an essentially horizontal plane to guide the snowmobile and in an essentially vertical plane to compensate for terrain irregularities, the improvement comprising:

a. a dash pot shock absorber having upper and lower ends;

b. first coupling means for pivotally connecting the lower ends of the shock absorber to the ski;

c. and second coupling means for connecting the upper end of the shock absorber to the snowmobile body separate from the rotatable steering rod, the second coupling means constructed and arranged to permit free multi-directional movement of said operation with respect to the snowmobile body.

6. The apparatus as defined by claim 5, wherein the second coupling means comprises a ball rigidly affixed to the snowmobile body and a ball retaining socket connected to the upper end of the shock absorber.

* * * * *